US012568419B2

(12) United States Patent
Tan et al.

(10) Patent No.: US 12,568,419 B2
(45) Date of Patent: Mar. 3, 2026

(54) METHOD AND APPARATUS FOR APPLICATION AND RESOURCE ALLOCATION WITH SURVIVAL TIME

(71) Applicant: ZTE Corporation, Shenzhen (CN)

(72) Inventors: Jie Tan, Shenzhen (CN); Bo Dai, Shenzhen (CN); Xiubin Sha, Shenzhen (CN); Ting Lu, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 340 days.

(21) Appl. No.: 18/240,809

(22) Filed: Aug. 31, 2023

(65) Prior Publication Data

US 2023/0413151 A1 Dec. 21, 2023

Related U.S. Application Data

(63) Continuation of application No. PCT/CN2021/110754, filed on Aug. 5, 2021.

(51) Int. Cl.
| | |
|---|---|
| *H04W 36/30* | (2009.01) |
| *H04L 1/08* | (2006.01) |
| *H04W 36/00* | (2009.01) |
| *H04W 36/08* | (2009.01) |
| *H04W 72/12* | (2023.01) |
| *H04W 72/232* | (2023.01) |

(52) U.S. Cl.
CPC ............. *H04W 36/305* (2018.08); *H04L 1/08* (2013.01); *H04W 36/0064* (2023.05); *H04W 36/08* (2013.01); *H04W 72/12* (2013.01); *H04W 72/232* (2023.01)

(58) Field of Classification Search
CPC ............. H04W 36/305; H04W 72/232; H04W 36/0064; H04W 36/08; H04W 72/12; H04L 1/08
See application file for complete search history.

(56) References Cited

U.S. PATENT DOCUMENTS

| | | | | |
|---|---|---|---|---|
| 2019/0174449 A1* | 6/2019 | Shan | .................. | H04W 60/04 |
| 2020/0412842 A1* | 12/2020 | Park | .................... | H04L 69/04 |
| 2021/0100061 A1* | 4/2021 | Park | ................... | H04W 76/25 |
| 2021/0235399 A1* | 7/2021 | Wich | ................ | H04W 28/0268 |
| 2021/0314812 A1* | 10/2021 | Catovic | ................ | H04W 28/06 |

(Continued)

FOREIGN PATENT DOCUMENTS

WO WO 2021/138802 A1 7/2021

OTHER PUBLICATIONS

Office Action issued in Chinese Patent Application No. 202180099905.7 dated Dec. 5, 2024, w/English translation, 22 pages.

(Continued)

*Primary Examiner* — Jael M Ulysse
(74) *Attorney, Agent, or Firm* — Crowell & Moring LLP

(57) ABSTRACT

In wireless communication, a survival time is a parameter that can be wirelessly communicated on the Radio Access Network ("RAN") side. The survival time information is used for application and resource allocation for increased reliability. For example, the survival time state application and monitoring may be used for configuration of configured grant ("CG") resources when a user equipment ("UE") activates a duplication application.

20 Claims, 15 Drawing Sheets

(56) References Cited

U.S. PATENT DOCUMENTS

| | | | | |
|---|---|---|---|---|
| 2023/0087615 A1* | 3/2023 | Park | | H04W 72/231 |
| | | | | 370/329 |
| 2023/0113031 A1* | 4/2023 | Harada | | H04W 76/12 |
| | | | | 370/328 |
| 2023/0180027 A1* | 6/2023 | Xu | | H04L 1/16 |
| | | | | 370/329 |
| 2024/0163721 A1* | 5/2024 | Fan | | H04L 69/22 |
| 2025/0279859 A1* | 9/2025 | Park | | H04W 76/12 |

OTHER PUBLICATIONS

Extended European Search Report issued in European Patent Application No. 21952283.6 dated Dec. 9, 2024, 15 pages.

3rd Generation Partnership Project;Technical Specification Group Radio Access Network;NR; Radio Resource Control (RRC) protocol specification (Release 16), 3GPP TS 38.331, Jul. 6, 2021, 959 pages.

3rd Generation Partnership Project; Technical Specification Group Radio Access Network;NG-RAN; E1 Application Protocol (E1AP) (Release 16), 3GPP TS 38.463 V16.6.0, Jul. 2021, 239 pages.

Office Action issued in Chinese Patent Application No. 202180099905.7 dated Sep. 21, 2024, w/English translation, 37 pages.

Huawei, "Summary of Offline Discussion on Correction on missing IE of EHC" 3GPP TSG-RAN WG3 #112-e, R3-212758, 4 pages.

Intel Corporation, "Pre-compensation at the gNB for RTT and TA based PDC" d3GPP TSG RAN WG2 Meeting #114e, R2-2104886, May 27, 2021, 4 pages.

Supplementary Partial European Search Report issued in European Patent Application No. 21952283.6 dated Sep. 17, 2024, 17 pages.

Huawei, "Correction on missing IEof EHC" 3GPP TSG-RAN WG3 Meeting #112-e, R3-212016, May 28, 2021, 8 pages.

Chinese-language Office Action issued in Chinese Application No. 202180099905.7 dated Feb. 14, 2025 with English translation (18 pages).

International Search Report and Written Opinion received for Application No. PCT/CN2021/110754 mailed Apr. 24, 2022 (7 pages).

Intel Corporation, "RAN2 Enhancements to Support Survival Time," *3GPP TSG RAN WG2 Meeting* #114-e R2-2106066, May 27, 2021 (6 pp.).

Lenovo et al. "Discussion on the mechanism to guarantee the survival time," *3GPP TSG-RAN WG2 Meeting #114 electronic* R2-2105457, May 27, 2021 (6 pp.).

Qualcomm Incorporated, "RAN Enhancements to Support New QoS," *3GPP TSG-RAN WG2 Meeting #113e bis* R2-2102686, Apr. 12, 2021 (9 pp.).

ZTE Corporation et al. "Further discussion on enhanced QoS" *3GPP TSG-RAN WG2 Meeting #114 E-meeting* R2-2105312, May 27, 2021 (4 pp.).

* cited by examiner

Figure 1

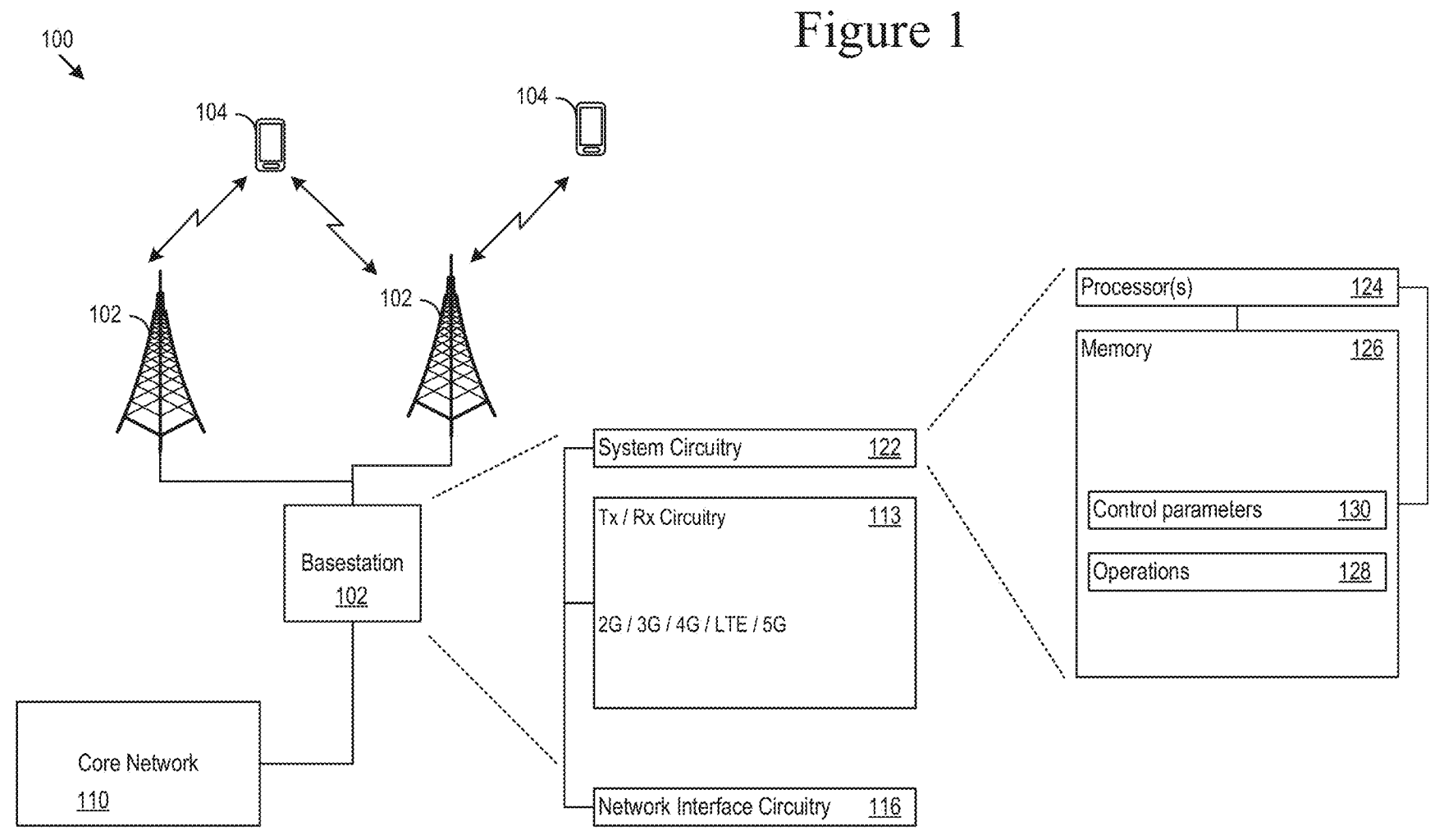

Processor(s) 124

Memory 126

Control parameters 130

Operations 128

System Circuitry 122

Tx / Rx Circuitry 113

2G / 3G / 4G / LTE / 5G

Network Interface Circuitry 116

104

102

104

102

Basestation 102

Core Network 110

100

302

RRC Message
(Configure inactive PDCP
duplication, CG type1)

402

RRC Message
(Configure inactive PDCP
duplication, CG type2)

404 gNB implementation
or Activation Timer

406

DCI
(activate Configured Grant)

gNB-CU gNB-DU

Request for  gNB Rx-Tx
time difference information

UE gNB-DU

Triggering method: send it actively by gNB-DU,
or send it based on the request of gNB-CU.

Predefined MAC CE (gNB
Rx-Tx time difference info)

Figure 18

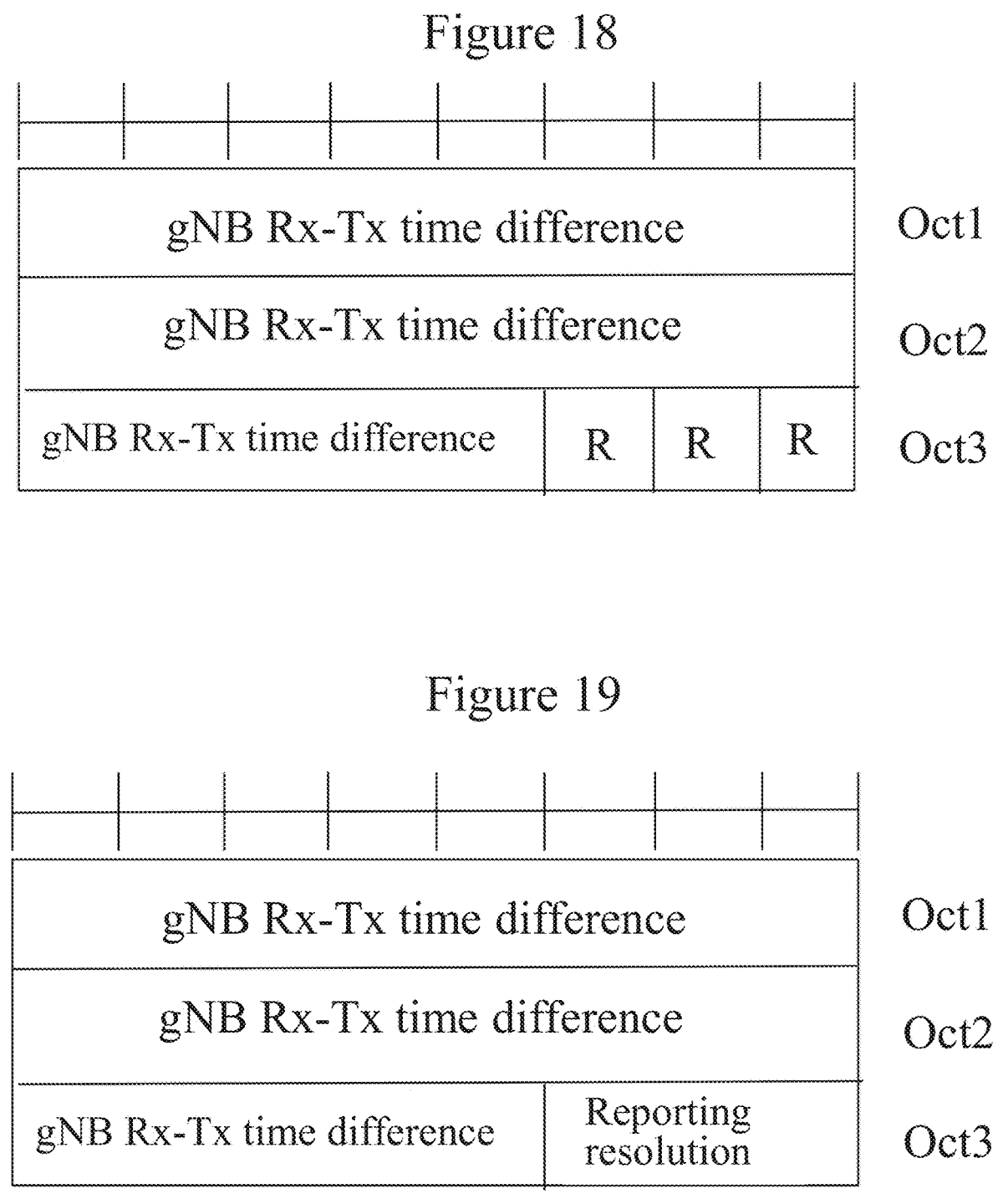

| gNB Rx-Tx time difference | | | | Oct1 |
| gNB Rx-Tx time difference | | | | Oct2 |
| gNB Rx-Tx time difference | R | R | R | Oct3 |

Figure 19

| gNB Rx-Tx time difference | | Oct1 |
| gNB Rx-Tx time difference | | Oct2 |
| gNB Rx-Tx time difference | Reporting resolution | Oct3 |

METHOD AND APPARATUS FOR APPLICATION AND RESOURCE ALLOCATION WITH SURVIVAL TIME

PRIORITY

This application claims priority as a Continuation to PCT/CN2021/110754, filed on Aug. 5, 2021, published as WO 2023/010387 A1, entitled "METHOD AND APPARATUS FOR APPLICATION AND RESOURCE ALLOCATION WITH SURVIVAL TIME", the entire disclosure of which is herein incorporated by reference.

TECHNICAL FIELD

This document is directed generally to wireless communications. More specifically, a survival time timer is utilized for application and resource allocation.

BACKGROUND

Wireless communication technologies are moving the world toward an increasingly connected and networked society. Wireless communications rely on efficient network resource management and allocation between user mobile stations and wireless access network nodes (including but not limited to wireless base stations). A new generation network is expected to provide high speed, low latency and ultra-reliable communication capabilities and fulfil the requirements from different industries and users. User mobile stations or user equipment (UE) are becoming more complex and the amount of data communicated continually increases. In order to improve communications and meet reliability requirements for the vertical industry as well as support the new generation network service, communication improvements should be made.

SUMMARY

This document relates to methods, systems, and devices for communicating a survival time information for application and resource allocation. The parameter can be wirelessly communicated on the Radio Access Network ("RAN") side. The survival time information is used for application and resource allocation for increased reliability. For example, the survival time state application and monitoring may be used for configuration of configured grant ("CG") resources when a user equipment ("UE") activates a duplication application. A threshold of survival time can be used for triggering Packet Data Convergence Protocol ("PDCP") duplication.

In one embodiment, a method for wireless communication includes receiving a message including configured PDCP duplication function and configured grant (CG) type information; and activating a duplication function based on the retransmission scheduling information. The activating is performed independently by a user equipment ("UE") from an uplink transmission, and the message is received by the UE from a basestation. The method further includes receiving an activation message for activation of a configured grant; and the activation message comprises a predefined Downlink Communication Information ("DCI") including an indication to activate the configured grant. The PDCP duplication function further comprises configuration for multiple radio link control ("RLC") entities, and the RLC entities are configured for the UE for the activating. The configured grant type information comprises a configured grant type which does not require activation or a configured grant type which requires activation by predefined DCI. The message comprises a radio resource control "RRC" message, which includes at least one of RRCReestablishment, RRCReconfiguration, RRCResume, RRCReject, or RRC-Setup.

In one embodiment, a method for wireless communication includes receiving, after a retransmission of a first packet that was subject to a transmission failure, a status indication information; and performing, after receiving the status indication information, a status handover. A re-transmission scheduling information is provided from a basestation to a user equipment ("UE") and the UE performs the activating by the status indication information. The status indication information indicates whether the first packet retransmission was successful, and comprises at least one of an acknowledgment of a successful retransmission of the first packet, a keep survival time state indication when retransmission is unsuccessful, an exit survival time state indication when the retransmission is successful, or a non-acknowledgment for the retransmission. The method further includes transmitting a second packet transmission when the status indication information indicates the retransmission is not received; and receiving, when the second packet is received, a status indication information for the second packet on any branch. The status indication information indicates whether the second packet transmission was successful, and the information comprises a predefined DCI or MAC Control Element when the retransmission is successful.

In one embodiment, a method for wireless communication includes providing a survival time information during a handover process. A handover request includes the survival time information, and the request is provided by a source basestation to a target basestation, wherein the handover process is from the source basestation to the target basestation. An interruption time in the handover process and a reestablishment time in a radio link failure are included as part of a survival time measurement from the survival time information. The survival time information in uplink transmission includes at least one of an indication of a current survival time state, or an indication of a use of high priority to send packets. The survival time information in uplink transmission includes at least one of an indication of a current survival time state, a duration of the current survival time, an indication of a number of current continuous error packets, an indication of a remaining time of the current survival time, an indication of a remaining number of error packets of the current survival time, an indication of a time of entering the survival time state, or an indication of a use of high reliability to send packets. The handover process comprises a Dual Active Protocol Stack ("DAPS") handover.

In one embodiment, a method for wireless communication includes receiving a survival time information during a handover process. A handover request includes the survival time information, and the request is received by a target basestation from a source basestation, wherein the handover process is from the source basestation to the target basestation. A message A or a message 3 in a random access procedure includes the survival time information, and the message is received by the target basestation from a user equipment ("UE"). An interruption time in the handover process and a reestablishment time in a radio link failure are included as part of a survival time measurement from the survival time information. The survival time information in uplink transmission includes at least one of an indication of a current survival time state, or an indication of a use of high priority to send packets The survival time information in downlink transmission includes at least one of an indication of a current survival time state, a duration of the current survival time, an indication of a number of current continuous error packets, an indication of a remaining time of the current survival time, an indication of a remaining number of error packets of the current survival time, an indication of a time of entering the survival time state, or an indication of a use of high reliability to send packets. The handover process comprises a Dual Active Protocol Stack ("DAPS") handover.

In one embodiment, a method for wireless communication includes reporting a survival time information during a handover process. A message A or a message 3 in a random access procedure includes the survival time information, and the message is received by a target basestation from a user equipment ("UE"). The survival time information includes at least one of an indication of a current survival time state, a duration of the current survival time, an indication of a number of current continuous error packets, an indication of a remaining time of the current survival time, an indication of a remaining number of error packets of the current survival time, an indication of a time of entering the survival time state, an indication of a use of high reliability to send packets, an indication of a current survival time state, or an indication of a use of high priority to send packet.

In one embodiment, a wireless communications apparatus comprises a processor and a memory, and the processor is configured to read code from the memory and implement any of the embodiments discussed above.

In one embodiment, a computer program product comprises a computer-readable program medium code stored thereupon, the code, when executed by a processor, causes the processor to implement any of the embodiments discussed above.

In some embodiments, there is a wireless communications apparatus comprising a processor and a memory, wherein the processor is configured to read code from the memory and implement any methods recited in any of the embodiments. In some embodiments, a computer program product comprising a computer-readable program medium code stored thereupon, the code, when executed by a processor, causing the processor to implement any method recited in any of the embodiments. The above and other aspects and their implementations are described in greater detail in the drawings, the descriptions, and the claims.

BRIEF DESCRIPTION OF THE DRAWINGS

FIG. 1 shows an example basestation.

4

Figure 10:
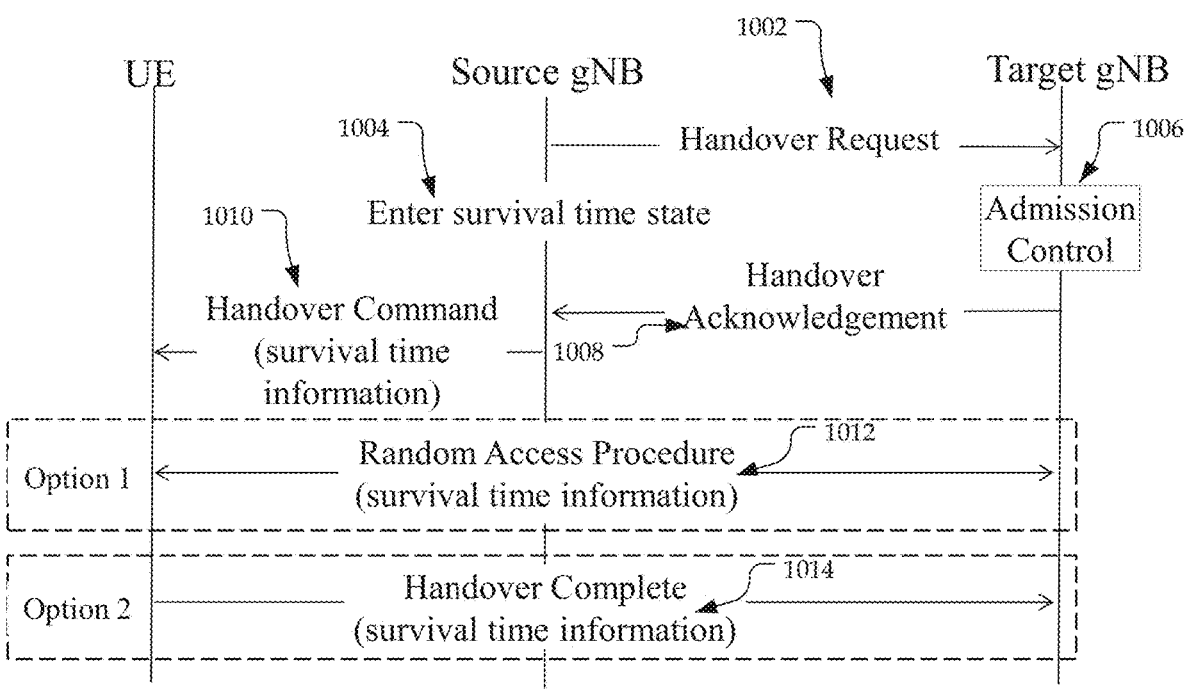
Figure 11:
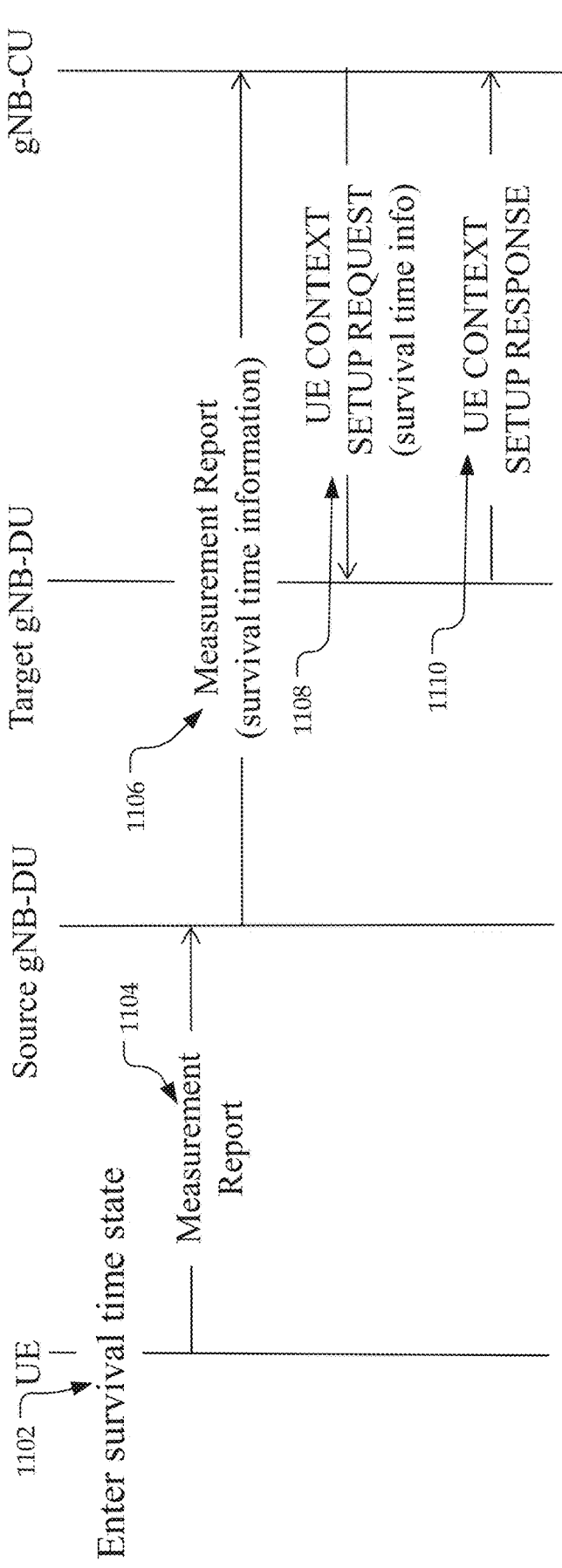
Figure 12:
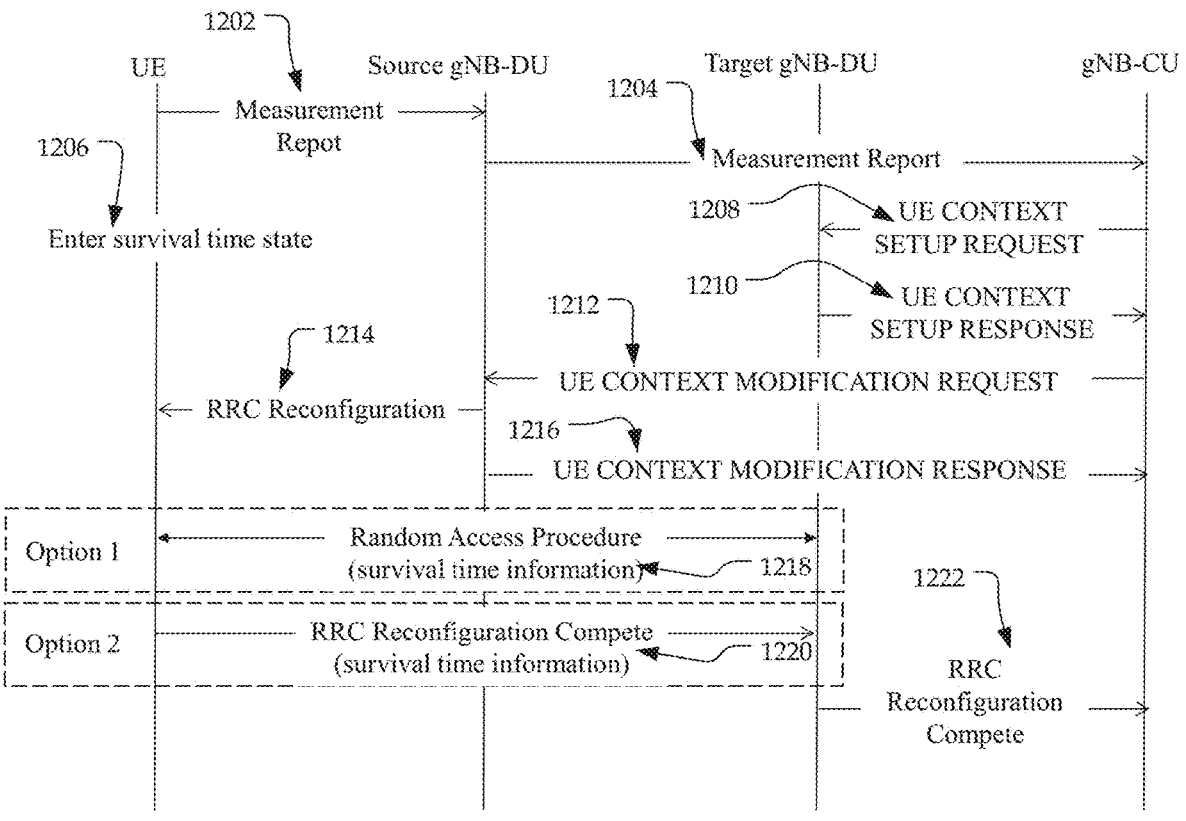
Figure 13:
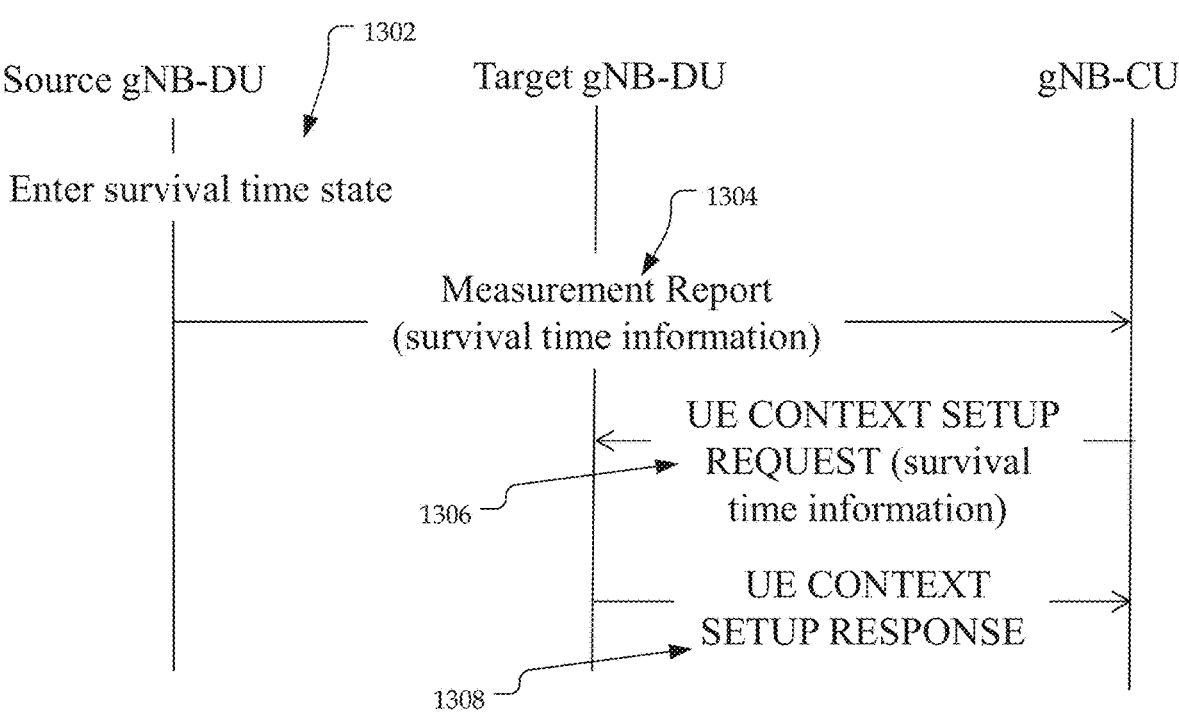
Figure 14:
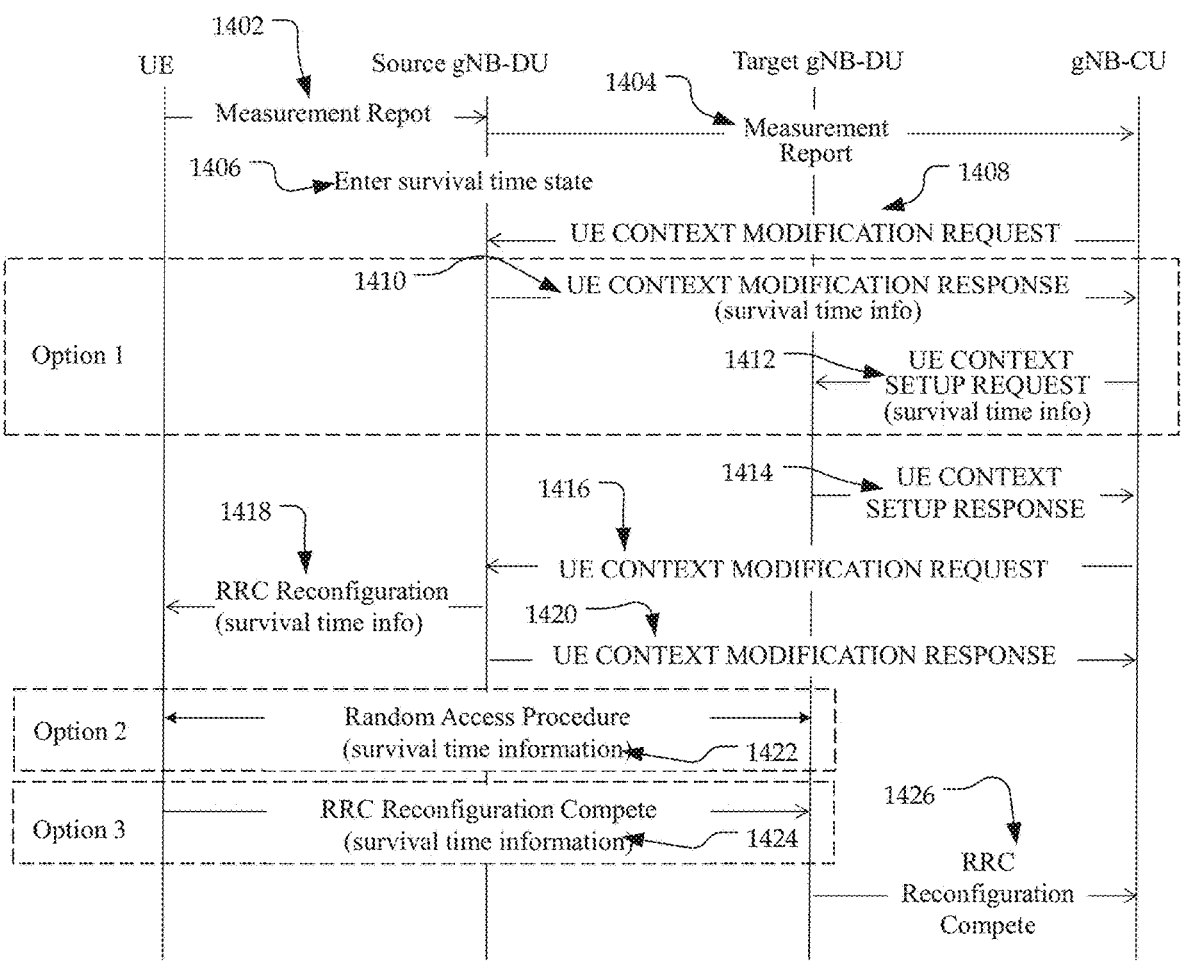
Figure 15:
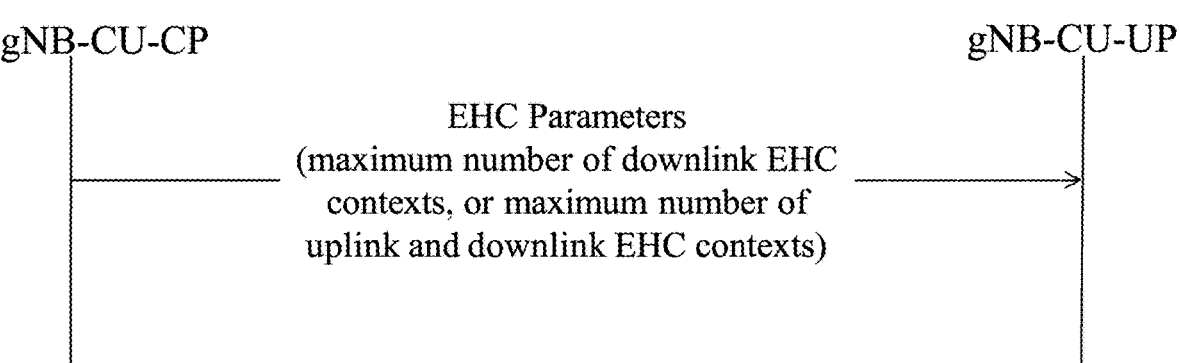
Figure 16:
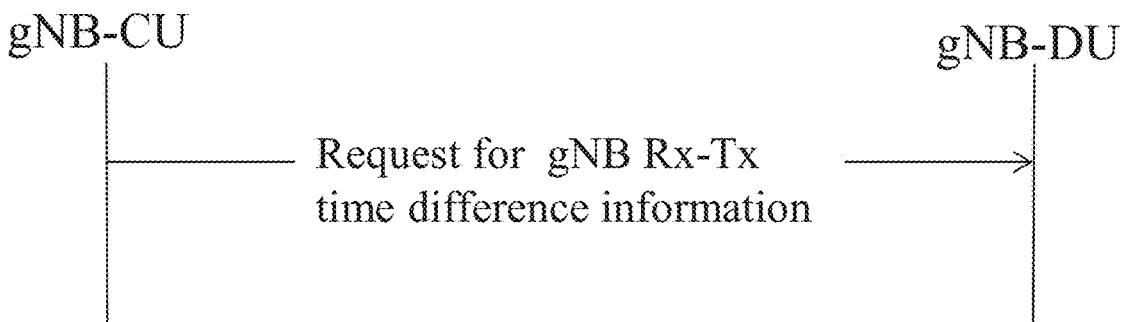
Figure 17:
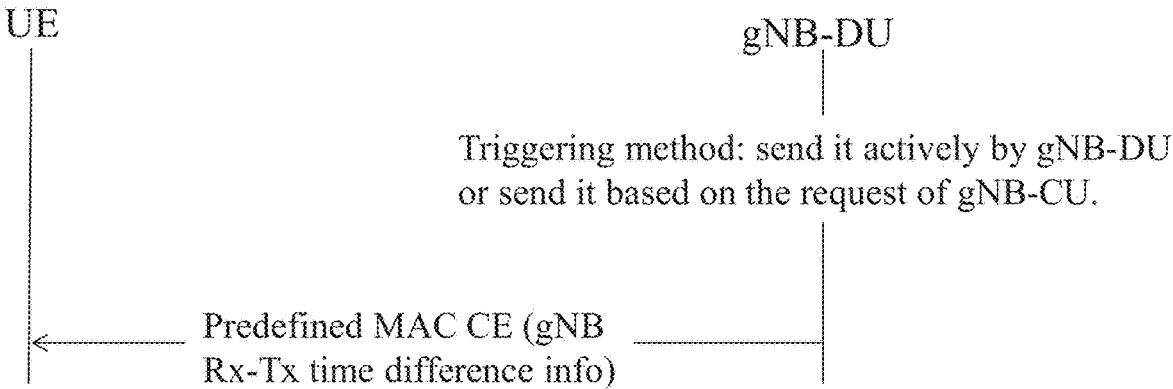

FIG. 10 shows an example of survival time monitoring in the downlink service when the UE enters the survival time state after the handover.
FIG. 11 shows an example of survival time monitoring of basestation distributed unit ("DU") and basestation centralized unit ("CU") in the uplink service when the UE enters the survival time state before the handover.
FIG. 12 shows an example of survival time monitoring of basestation distributed unit ("DU") and basestation centralized unit ("CU") in the uplink service when the UE enters the survival time state after the handover.
FIG. 13 shows an example of survival time monitoring of basestation distributed unit ("DU") and basestation centralized unit ("CU") in the downlink service when the UE enters the survival time state before the handover.
FIG. 14 shows an example of survival time monitoring of basestation distributed unit ("DU") and basestation centralized unit ("CU") in the downlink service when the UE enters the survival time state after the handover.
FIG. 15 shows an example of EHC parameters communicated between basestation centralized units ("CU").
FIG. 16 shows communication between a basestation centralized unit ("CU") and a basestation distribution unit ("DU").
FIG. 17 shows communication between a basestation distribution unit ("DU") and the user equipment ("UE") for sending the time different information.
FIG. 18 shows an example MAC CE format.
FIG. 19 shows another example MAC CE format.

DETAILED DESCRIPTION

The present disclosure will now be described in detail hereinafter with reference to the accompanied drawings, which form a part of the present disclosure, and which show, by way of illustration, specific examples of embodiments. Please note that the present disclosure may, however, be embodied in a variety of different forms and, therefore, the covered or claimed subject matter is intended to be construed as not being limited to any of the embodiments to be set forth below.

Throughout the specification and claims, terms may have nuanced meanings suggested or implied in context beyond an explicitly stated meaning. Likewise, the phrase "in one embodiment" or "in some embodiments" as used herein does not necessarily refer to the same embodiment and the phrase "in another embodiment" or "in other embodiments" as used herein does not necessarily refer to a different embodiment. The phrase "in one implementation" or "in some implementations" as used herein does not necessarily refer to the same implementation and the phrase "in another implementation" or "in other implementations" as used herein does not necessarily refer to a different implementation. It is intended, for example, that claimed subject matter includes combinations of exemplary embodiments or implementations in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" or "at least one" as used herein, depending at least in part upon context, may be used to describe any feature, structure, or characteristic in a singular sense or may be used to describe combinations of features, structures or characteristics in a plural sense. Similarly, terms, such as "a", "an", or "the", again, may be understood to convey a singular usage or to convey a plural usage, depending at least in part upon context. In addition, the term "based on" or "determined by" may be understood as not necessarily intended to convey an exclusive set of factors and may, instead, allow for existence of additional factors not necessarily expressly described, again, depending at least in part on context.

New Radio Access ("NR") includes the parameter survival time in the application layer to relax the quality of service ("QoS") requirements for reliability. The survival time may be transferred as part of the TSC Assistance Information ("TSCAI") parameter. The TSCAI may not always include the survival time. The Session Management Function ("SMF") determines survival time and sends it to the Next Generation Radio Access Network ("NG RAN") as part of TSCAI without requiring a specific signalling exchange with the user equipment ("UE") device. The RAN may be a part of a wireless communication system that connects UE devices to other parts of a network through radio or wireless connections.

As described below, the survival time and or parameters related to service may be referred to as service related parameters or information. The methods, systems, and devices described herein communicate those parameters wirelessly on the Radio Access Network ("RAN") side and utilize them for survival time measurements. A threshold of survival time can be used for triggering Packet Data Convergence Protocol ("PDCP") duplication. The parameters can be provided by an Access and Mobility Management Function ("AMF") to a user equipment ("UE") device by a radio resource control ("RRC") message or provided by a basestation by non-access stratum ("NAS") signalling.

Radio resource control ("RRC") is a protocol layer between UE and the basestation at the IP level (Network Layer). RRC messages are transported via the Packet Data Convergence Protocol ("PDCP"). As described, UE can transmit infrequent (periodic and/or non-periodic) data in RRC_INACTIVE state without moving to an RRC_CONNECTED state. This can save the UE power consumption and signaling overhead. This can be through a Random Access Channel ("RACH") protocol scheme or a Configured Grant ("CG") scheme. CG may be used to reduce the waste of periodically allocated resources by enabling multiple devices to share periodic resources. The basestation may assign CG resources to eliminate packet transmission delay and to increase a utilization ratio of allocated periodic radio resources. The CG scheme is merely one example of a protocol scheme for communications and other examples, including but not limited to RACH, are possible.

The survival time may include the time that an application consuming a communication service may continue without an anticipated message. The survival time information may further include the maximum number of consecutive message transmission failures. The SMF translates the maximum number of consecutive message transmission failures to a time unit based on a TSCAI periodicity parameter and determines survival time.

The monitoring mechanism for survival time and its application on the RAN side can be improved. In one example, for the configuration of configured grant ("CG") resources when the UE activates PDCP duplication, the exiting of the survival time state may be improved. In addition, the application of a survival time monitoring mechanism can also be improved.

FIG. 1 shows an example basestation 102. The basestation may also be referred to as a wireless network node. The basestation 102 may be further identified to as a nodeB (NB, e.g., an eNB or gNB) in a mobile telecommunications context. The example basestation may include radio Tx/Rx circuitry 113 to receive and transmit with user equipment (UEs) 104. The basestation may also include network interface circuitry 116 to couple the basestation to the core network 110, e.g., optical or wireline interconnects, Ethernet, and/or other data transmission mediums/protocols.

The basestation may also include system circuitry 122. System circuitry 122 may include processor(s) 124 and/or memory 126. Memory 126 may include operations 128 and control parameters 130. Operations 128 may include instructions for execution on one or more of the processors 124 to support the functioning the basestation. For example, the operations may handle random access transmission requests from multiple UEs. The control parameters 130 may include parameters or support execution of the operations 128. For example, control parameters may include network protocol settings, random access messaging format rules, bandwidth parameters, radio frequency mapping assignments, and/or other parameters.

Figure 2:
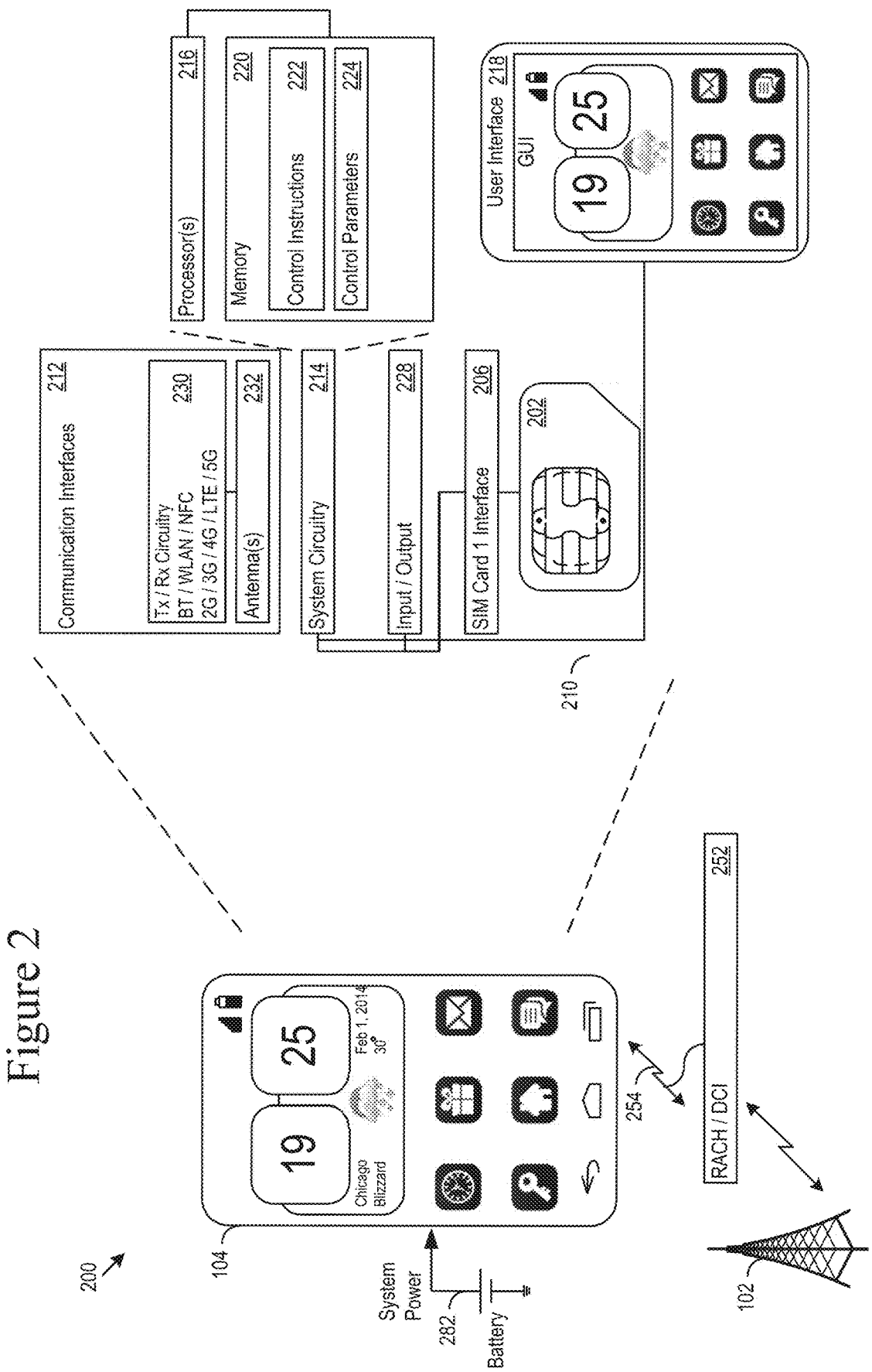
FIG. 2 shows an example random access (RA) messaging environment.

FIG. 2 shows an example random access messaging environment 200. In the random access messaging environment a UE 104 may communicate with a basestation 102 over a random access channel 252. In this example, the UE 104 supports one or more Subscriber Identity Modules (SIMs), such as the SIM1 202. Electrical and physical interface 206 connects SIM1 202 to the rest of the user equipment hardware, for example, through the system bus 210.

The mobile device 200 includes communication interfaces 212, system logic 214, and a user interface 218. The system logic 214 may include any combination of hardware, software, firmware, or other logic. The system logic 214 may be implemented, for example, with one or more systems on a chip (SoC), application specific integrated circuits (ASIC), discrete analog and digital circuits, and other circuitry. The system logic 214 is part of the implementation of any desired functionality in the UE 104. In that regard, the system logic 214 may include logic that facilitates, as examples, decoding and playing music and video, e.g., MP3, MP4, MPEG, AVI, FLAC, AC3, or WAV decoding and playback; running applications; accepting user inputs; saving and retrieving application data; establishing, maintaining, and terminating cellular phone calls or data connections for, as one example, Internet connectivity; establishing, maintaining, and terminating wireless network connections, Bluetooth connections, or other connections; and displaying relevant information on the user interface 218. The user interface 218 and the inputs 228 may include a graphical user interface, touch sensitive display, haptic feedback or other haptic output, voice or facial recognition inputs, buttons, switches, speakers and other user interface elements. Additional examples of the inputs 228 include microphones, video and still image cameras, temperature sensors, vibration sensors, rotation and orientation sensors, headset and microphone input/output jacks, Universal Serial Bus (USB) connectors, memory card slots, radiation sensors (e.g., IR sensors), and other types of inputs.

The system logic 214 may include one or more processors 216 and memories 220. The memory 220 stores, for example, control instructions 222 that the processor 216 executes to carry out desired functionality for the UE 104. The control parameters 224 provide and specify configuration and operating options for the control instructions 222.

The memory 220 may also store any BT, WiFi, 3G, 4G, 5G or other data 226 that the UE 104 will send, or has received, through the communication interfaces 212. In various implementations, the system power may be supplied by a power storage device, such as a battery 282

In the communication interfaces 212, Radio Frequency (RF) transmit (Tx) and receive (Rx) circuitry 230 handles transmission and reception of signals through one or more antennas 232. The communication interface 212 may include one or more transceivers. The transceivers may be wireless transceivers that include modulation/demodulation circuitry, digital to analog converters (DACs), shaping tables, analog to digital converters (ADCs), filters, waveform shapers, filters, pre-amplifiers, power amplifiers and/or other logic for transmitting and receiving through one or more antennas, or (for some devices) through a physical (e.g., wireline) medium.

The transmitted and received signals may adhere to any of a diverse array of formats, protocols, modulations (e.g., QPSK, 16-QAM, 64-QAM, or 256-QAM), frequency channels, bit rates, and encodings. As one specific example, the communication interfaces 212 may include transceivers that support transmission and reception under the 2G, 3G, BT, WiFi, Universal Mobile Telecommunications System (UMTS), High Speed Packet Access (HSPA)+, and 4G/Long Term Evolution (LTE) standards. The techniques described below, however, are applicable to other wireless communications technologies whether arising from the 3rd Generation Partnership Project (3GPP), GSM Association, 3GPP2, IEEE, or other partnerships or standards bodies.

A duplication function may include packet duplication that ensures that packets are not missed and reliability is improved. Packet Data Convergence Protocol ("PDCP") duplication is one example of a duplication function. The PDCP layer handles transfer of user data, header compression, sequence numbering, duplication detection, packet duplication, etc. PDCP duplication may be supported for both user and control planes. The PDCP layer in the transmitter may be responsible for packet duplication while the PDCP layer in the receiver can detect duplicate packets. Duplicated packets have the same PDCP sequence number, which can be used for identification.

In one example, the basestation configures active PDCP duplication through RRC signaling. The CG type1 resource may be configured on the bandwidth part (active state) of the serving cell corresponding to each branch in the PDCP duplication. In another example, the basestation configures the inactive PDCP duplication through RRC signaling and activates it through a MAC Control Element ("MAC CE") when the basestation determines it is necessary to use it. The CG type2 resource is configured on the bandwidth part (active state) of the service cell corresponding to each branch of the PDCP duplication, and the basestation activates the required CG type2 resource through the downlink control information ("DCI") based on the current service information. There may be a delay in basestation activation of PDCP duplication, so the UE can activate PDCP duplication independently in uplink packet transmission.

In the configuration of the UE activating PDCP Duplication, a pre-configuration method of inactive PDCP duplication may include configuring multiple radio link control ("RLC") entities, where the UE chooses to activate one or more RLC entities, or it may include configuring one or more dedicated RLC entities for the UE to activate the PDCP duplication. The CG resource method for an inactive PDCP duplication configuration may be shown in FIGS. 3-4.

Figure 3:
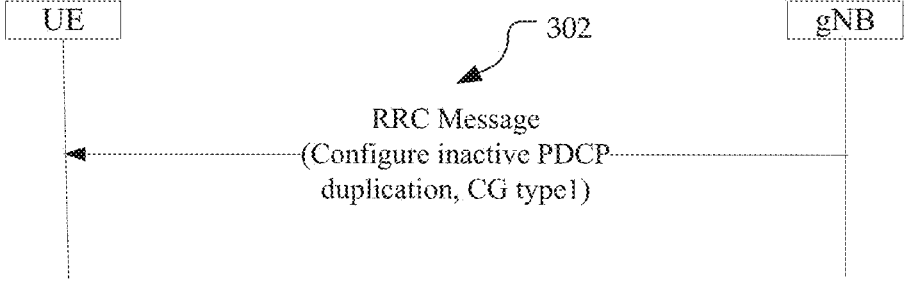
FIG. 3 shows one embodiment of duplication messaging.

FIG. 3 shows one embodiment of duplication messaging. For FIG. 3, the UE independently activates PDCP duplication. In the uplink packet transmission, the UE can trigger the UE to activate the PDCP duplication autonomously. In block 302, the gNB (i.e. basestation) configures inactive PDCP duplication with CG type1 in an RRC message. The RRC message 302 may include at least one of the following: RRCReestablishment, RRCReconfiguration, RRCResume, RRCReject, RRCSetup.

On the service cell corresponding to each branch of the PDCP duplication, the CG type1 resource may be configured for the activated bandwidth part ("BWP"). The use of the CG type1 resource may include: 1) the resource is a resource dedicated to UE triggering PDCP duplication to send uplink data; 2) the resource is a non-dedicated resource that can be used to send other uplink data, but the uplink data that UE triggers PDCP duplication to send has a higher priority; or 3) the resource is inactive for the UE and will only be activated when the UE triggers PDCP duplication. After the UE activates the configuration of the PDCP duplication, the resource release needs to be performed for the CG resources corresponding to one or more unused RLC entities. For example, the UE independently deactivates CG resources, such as the UE not sending packets on CG resources or the UE sending other packets on CG resources.

Figure 4:
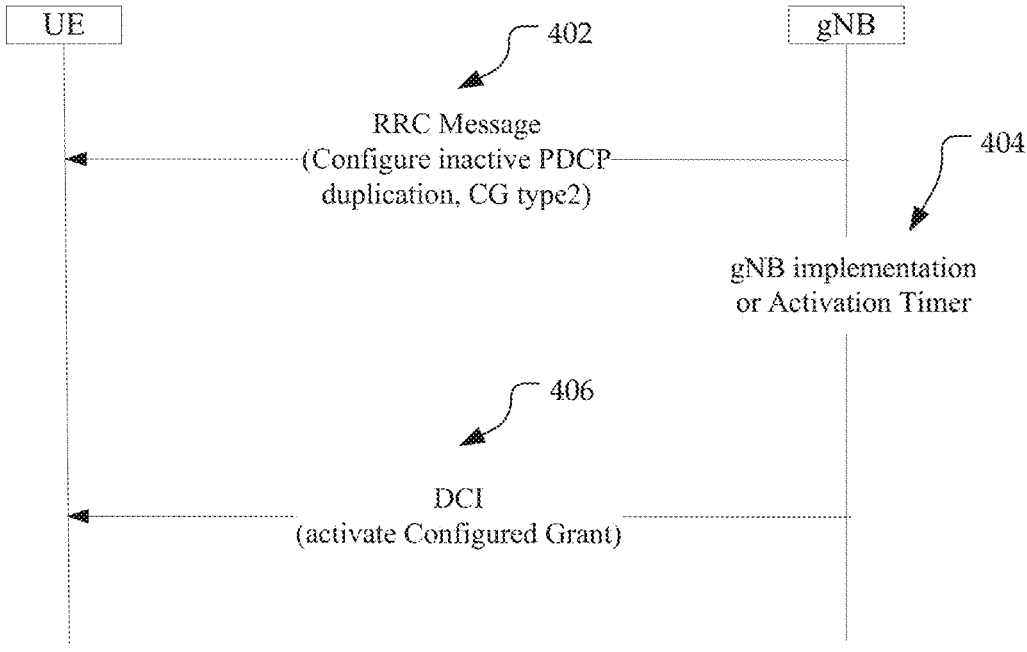
FIG. 4 shows another embodiment of duplication messaging.

FIG. 4 shows another embodiment of duplication messaging. For FIG. 4, the UE independently activates PDCP duplication. In the uplink packet transmission, the UE can trigger the UE to activate the PDCP duplication autonomously. In block 402, the gNB (i.e. basestation) configures inactive PDCP duplication with CG type2 in an RRC message. The RRC message 402 may include at least one of the following: RRCReestablishment, RRCReconfiguration, RRCResume, RRCReject, RRCSetup. In block 404, the gNB (i.e. basestation) uses an activation timer or a gNB implementation to trigger a predefined downlink control information ("DCI") to indicate the activation of the Configured Grant ("CG") in block 406. CG may be used to reduce the waste of periodically allocated resources by enabling multiple devices to share periodic resources. The basestation may assign CG resources to eliminate packet transmission delay and to increase a utilization ratio of allocated periodic radio resources. When the service is periodic, the activation timer starts when no packet is received on the period in which the packet should be received. The value of the timer may be set as less than the threshold of survival time. Before the timer expires, the timer is reset if the packet is received. Otherwise, the predefined DCI in block 406 is triggered to activate the CG after the timer expires.

On the service cell corresponding to each branch of the PDCP duplication, an inactive CG type2 resource is configured for the activated bandwidth part ("BWP"). Based on the information (retransmission schedule, a timer, etc.) on the gNB side, the predefined DCI indication information for activating the CG type2 resource may be triggered. The predefined DCI indication information may also be the enable indication information that the UE side can activate the PDCP duplication. After the CG type2 resource is activated, the use of the resource includes at least one of: 1) the resource is a resource dedicated to UE triggering PDCP duplication to send uplink data; 2) the resource is a non-dedicated resource and can be used to send other uplink data, but the uplink data that the UE triggers PDCP duplication to send has a higher priority; or 3) the resource is inactive for the UE and will only be activated when the UE triggers PDCP duplication.

After the UE activates the configuration of the PDCP duplication, the resource release is performed for the CG resources corresponding to one or more unused RLC entities. In one example of deactivating the PDCP duplication, the resource release needs to be performed for the CG resources corresponding to one or more used RLC entities. The releasing of CG resources may include: 1) the UE independently deactivates CG resources, for example, UE does not send packets in CG resources or the UE sends other packets in CG resources, or 2) the gNB performs existing deactivation mechanisms where gNB receives the indication for deactivating CG resources through CSI reports or a Buffer Status Report ("BSR").

There may be a transmission delay and a waste of resources in the uplink transmission, which can be improved with explicit feedback for data packets. It is possible to implicitly indicate that the packet was sent unsuccessfully by retransmission scheduling indication/information. In the case of introducing the parameter survival time, the UE may trigger entry into the survival time state based on the retransmission scheduling indication/information and activates the PDCP duplication independently. The information may further include how the UE side determines that the PDCP duplication function needs to be deactivated or the survival time status needs to be exited.

Figure 5:
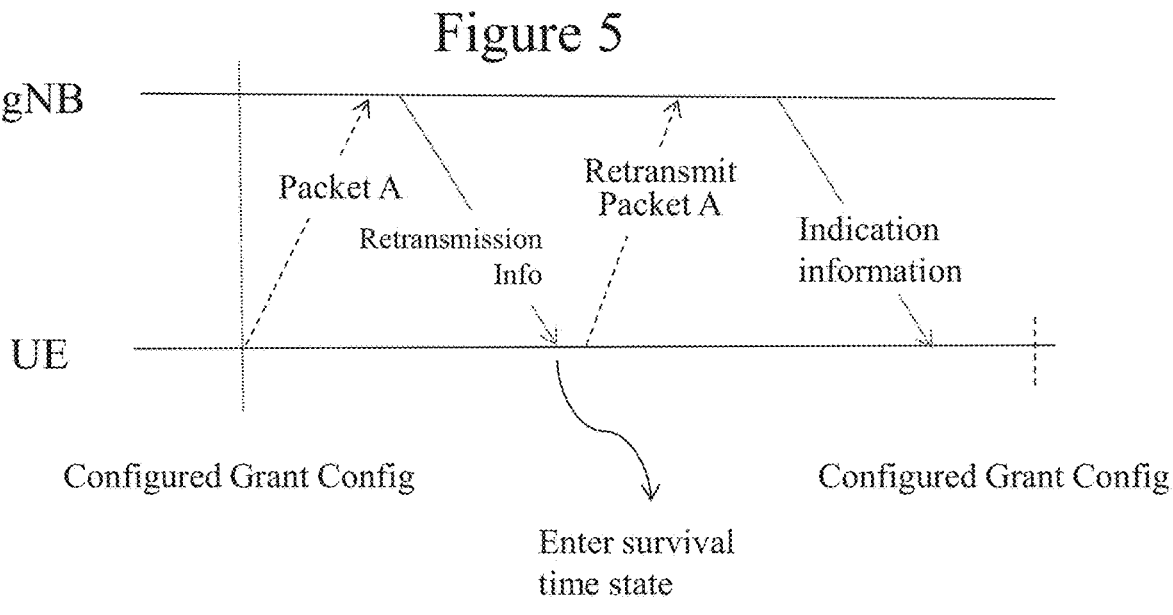
FIG. 5 shows an embodiment of messaging with the basestation for survival time status and duplication.
Figure 6:
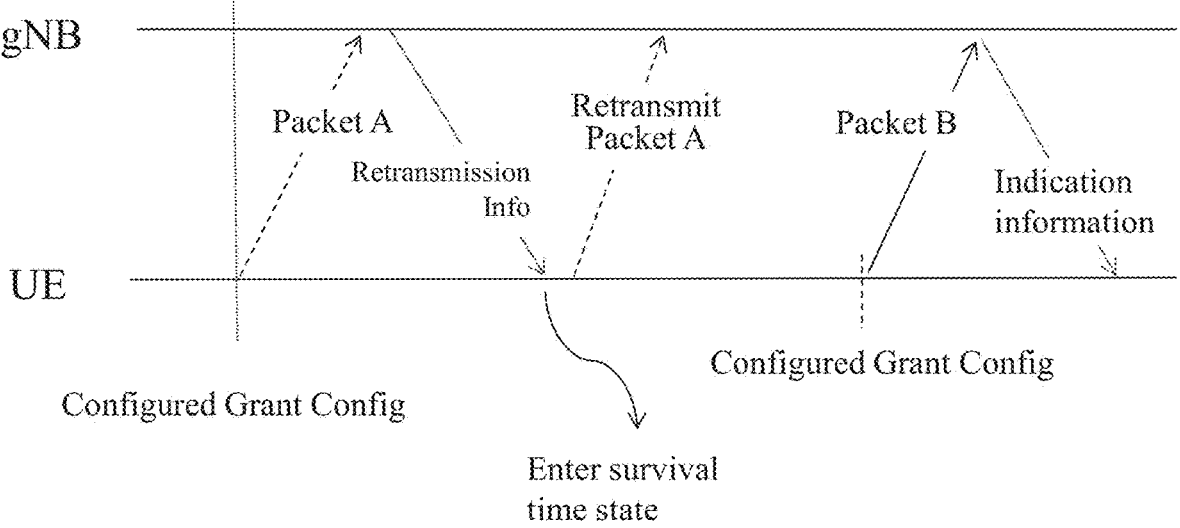
FIG. 6 shows another embodiment of messaging with the basestation for survival time status and duplication.

FIGS. 5-6 illustrate indications for the UE to exit survival time status or deactivate a PDCP duplication function based on communications between the basestation and the UE. After the UE is triggered to enter the survival time state and activate PDCP duplication function based on the retransmission information (also referred to as ReTx grant or retransmission scheduling), the UE identification can exit the survival time state or deactivate PDCP duplication function by FIG. 5 when the retransmission is successful or by FIG. 6 when the retransmission fails and another packet is sent.

FIG. 5 shows an embodiment of messaging with the basestation for survival time status and duplication. In FIG. 5, after the initial transmission of the packet fails, the UE enters a survival time state based on receipt of the retransmission information sent by the basestation. When the retransmission packet is sent successfully, the basestation must inform the UE through the indication information. The indication information (also referred to as status indication information) notifies the UE of successful retransmission of Packet A. If the indication information does not indicate the successful sending of the packet, then the survival time state is maintained. The basestation informs the UE that the indication information may be through a predefined DCI or MAC CE. The indication information may include a description of whether the re-transmission packet is successful or not. This indication information may include: 1) an explicit acknowledgment (ACK) that is sent for a successful retransmission packet, which fails by default if the UE does not receive the indication; 2) a keep survival time state indication for a retransmission packet that indicates that the packet failed to be sent; 3) an exit survival time state indication for a retransmission packet that is sent indicating that the packet was sent successfully; or 4) an explicit non-acknowledgment (NACK) that is sent for the last retransmission packet, which is successful by default if the indication is not received.

FIG. 6 shows another embodiment of messaging with the basestation for survival time status and duplication. For the unsuccessful retransmission of the packet, the UE defaults to the unsuccessful delivery of the current packet and is ready to send the next packet (Packet B) in the next cycle. After the UE sends the first packet of the next packet through PDCP duplication, the basestation may receive multiple identical packets. The basestation can notify the UE that the first transmission of the next packet is successful through the indication information described above. Examples of the indication information include: 1) if the UE does not receive the retransmission information on any branch, the packet is sent successfully by default; 2) if the UE receives a predefined DCI or MAC CE on any branch, which contains an ACK indication of a successful delivery of the packet, the packet is sent successfully; or 3) when the UE receives the information that the first transmission of the packet fails on all branches (i.e. each branch needs to re-transmit the packet). After the UE receives the above indication information, if the packet is sent successfully, the UE exits the survival time state and deactivates the PDCP duplication. If the packet is not sent successfully, the UE remains in the survival time state.

In the process of mobile handover, the survival time information can be utilized differently. For example, in the traditional handover, the service interruption time may be at least as long as 5 milliseconds. In the Dual Active Protocol Stack ("DAPS") handover, the UE receives the handover command to initiate random access procedure while the UE maintains data transmission with the source basestation. In both the traditional and DAPS handover, the parameter survival time can be included with indication information about the survival time status in the handover process. The basestation can be divided into two physical entities named Centralized Unit ("CU") and Distributed Unit ("DU"). In order to ensure that the survival time does not exceed the allowable range, the target basestation (e.g. target distributed unit ("DU")) may need to send/receive data packets more reliably based on survival time monitoring information.

In the handover process, based on the definition of survival time, the survival time measurement on the UE side or the basestation side should not restart because of the handover interruption. In other words, the interruption time in the handover process is included in the survival time measurement. In the case of radio link failure, the reestablishment time may also be included in the survival time measurement. In the uplink transmission, the survival time monitoring information may include at least one of an indication of the current survival time state or an indication of the use of high reliability to send packets. In the downlink transmission, the survival time monitoring information may include at least one of an indication of the current survival time state, an indication of the duration of the current survival time, an indication of the number of current continuous error packets, an indication of the remaining time of the current survival time, an indication of the remaining number of error packets of the current survival time, an indication of the time of entering the survival time state, or an indication of the use of high reliability to send packets. The handover can be divided into the handover between basestation and basestation (gNB-gNB) and the handover between basestation distributed units (gNB-DU to gNB-DU).

Figure 7:
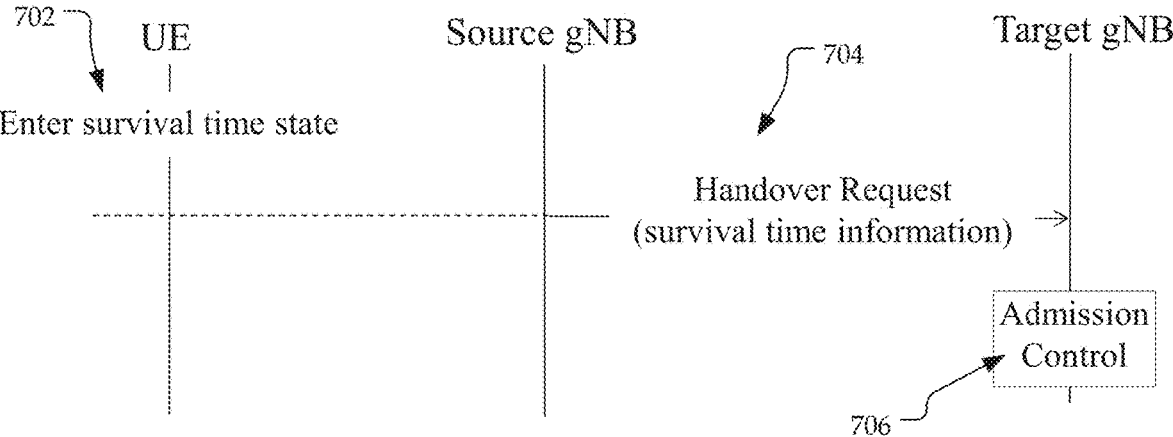
FIG. 7 shows an example of survival time monitoring in the uplink service during a handover process.
Figure 8:
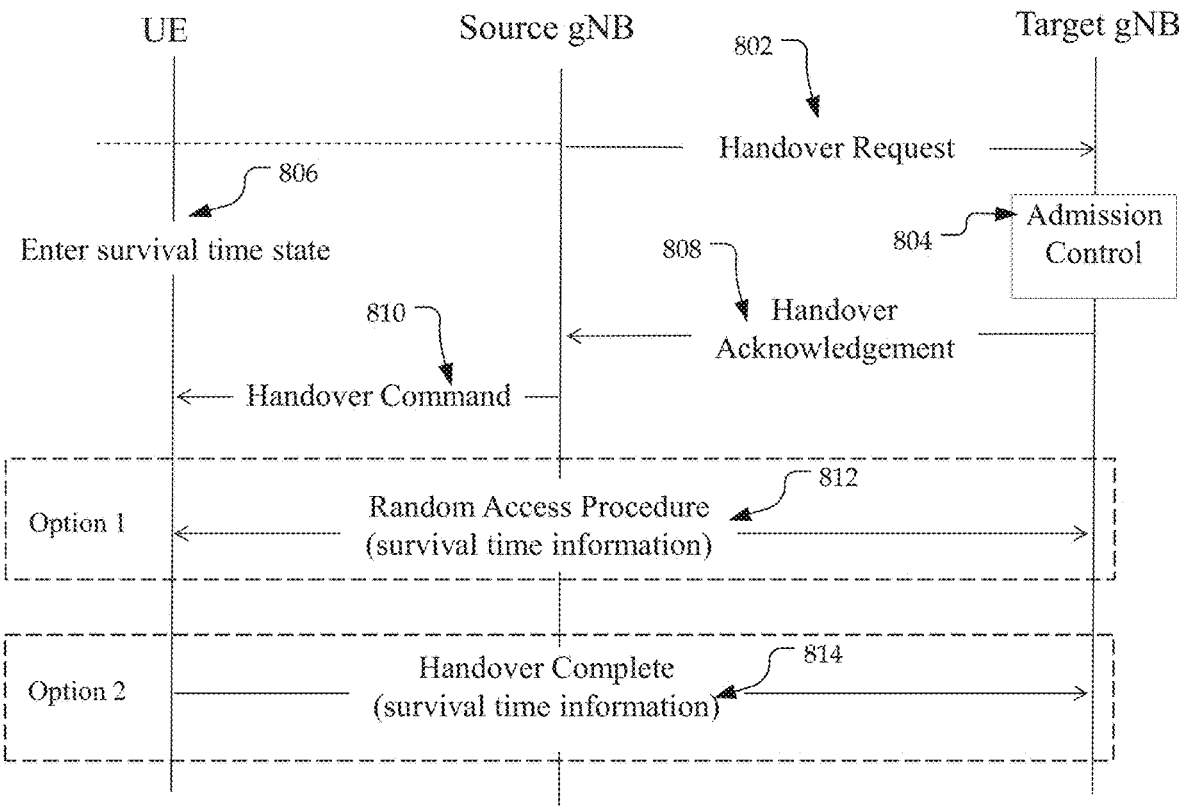
FIG. 8 shows an example of survival time monitoring in the uplink service during a handover process.

FIGS. 7-8 show the UE implementing the survival time monitoring mechanism in the uplink service. FIG. 7 shows an example of survival time monitoring in the uplink service when the UE enters the survival time state before the handover. In block 702, the UE first enters the survival time state. The handover request 704 is transmitted and includes survival time information to notify the target basestation. The target basestation performs admission control 706.

FIG. 8 shows an example of survival time monitoring in the uplink service when the UE enters the survival time state after the handover. The handover request 802 is sent by the source basestation before the UE enters the survival time state 806. Admission control 804 and a handover acknowledgement 808 are from the target basestation. A handover command 810 is provided from the source basestation to the UE. The target basestation obtains the survival time monitoring information by at least one of two options: 1) the survival time information may be included in a message of the Random Access Procedure 812, wherein the message includes message A in 2-step RACH (Random Access Channel) and message 3 in 4-step RACH; or 2) the survival time information may be included in the Handover Complete of the UE 814.

Figure 9:
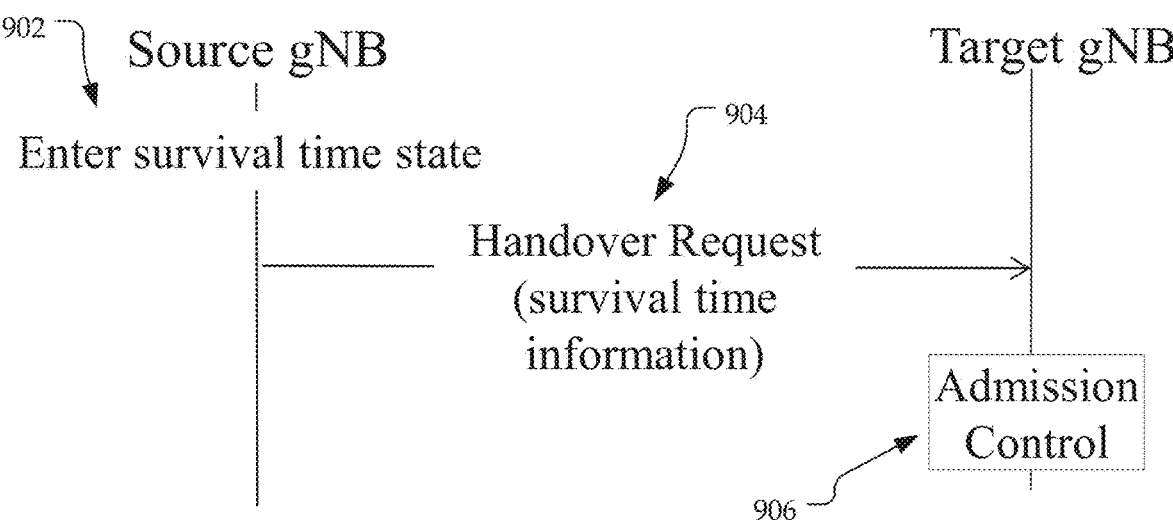
FIG. 9 shows an example of survival time monitoring in the downlink service when the UE enters the survival time state before the handover.

FIGS. 9-10 show the basestation implementing the survival time monitoring mechanism in the downlink service. FIG. 9 shows an example of survival time monitoring in the downlink service when the UE enters the survival time state before the handover. As shown in FIG. 9, when the source basestation enters the survival time state 902 before handover, the source basestation includes survival time information in the Handover Request 904 to notify the target basestation. The target basestation has admission control 906.

FIG. 10 shows an example of survival time monitoring in the downlink service when the UE enters the survival time state after the handover. The handover request 1002 precedes the source basestation entering the survival time state 1004. The target basestation has admission control 1006 and provides a handover acknowledgement 1008 to the source basestation. The survival time information is included in the Handover Command 1010 from the source basestation to the UE. The target basestation obtains the survival time monitoring information by at least one of the following: 1) the survival time information is included in a message of the Random Access Procedure 1012, wherein the message includes message A in 2-step RACH (Random Access Channel) and message 3 in 4-step RACH; or 2) the survival time information is included in the Handover Complete of the UE 1014.

FIGS. 11-12 show the UE implementing the survival time monitoring mechanism in the uplink service when switching between basestation distributed unit ("DU"). FIG. 11 shows an example of survival time monitoring of basestation distributed unit ("DU") and basestation centralized unit ("CU") in the uplink service when the UE enters the survival time state before the handover. The UE first enters the survival time state 1102. A measurement report 1104 is provided to the source basestation DU. The measurement report 1104 may be information for a UE to report measurements to a basestation to assist in handover decisions. The measurement report may include survival time information for the basestation CU 1106. The survival time information may be included in a UE context setup request 1108 from the basestation CU to the target basestation DU. In response, a UE context setup response 1110 is provided. In other words, the UE enters the survival time state before handover, and the basestation CU includes the survival time information in the UE CONTEXT SETUP REQUEST 1108 notifying the target basestation-DU, and basestation-CU of the survival time information obtained through the measurement report 1106.

FIG. 12 shows an example of survival time monitoring of basestation distributed unit ("DU") and basestation centralized unit ("CU") in the uplink service when the UE enters the survival time state after the handover. The measurement report 1202 is provided from the UE to the source basestation-DU, which then provides the measurement report 1204 to the basestation-CU. The survival time state 1206 is entered after the handover request which is part of the measurement report. After a UE context setup request 1208 and a UE context setup response 1210, a UE context modification request 1212 is provided to the source basestation-DU, which provides RRC reconfiguration 1214 to the UE and a UE context modification response 1216 to the basestation-CU. When the UE enters the survival time state after handover, the target basestation-DU obtains the survival time monitoring information by at least one of two options: 1) the survival time information is included in a message of the Random Access Procedure 1218, wherein the message includes message A in 2-step RACH (Random Access Channel) and message 3 in 4-step RACH; or 2) the survival time information is included in the RRC Reconfiguration Compete of the UE 1220.

FIGS. 13-14 show the basestation implementing the survival time monitoring mechanism in the downlink service. FIG. 13 shows an example of survival time monitoring of basestation distributed unit ("DU") and basestation centralized unit ("CU") in the downlink service when the UE enters the survival time state before the handover. When the UE enters the survival time state 1302 before handover (measurement report 1304), the basestation-CU contains the survival time information in the UE CONTEXT SETUP REQUEST 1306 notifying the target basestation-DU, and the basestation-CU of the survival time information obtained through the measurement report handover request 1304. A UE context setup response 1308 is provided in response.

FIG. 14 shows an example of survival time monitoring of basestation distributed unit ("DU") and basestation centralized unit ("CU") in the downlink service when the UE enters the survival time state after the handover. The handover request or measurement report 1402 is provided by the UE to the source basestation-DU, which is then provided from the source basestation-DU to the basestation-CU 1404. The survival time state 1406 is then entered, which is after the handover request. A UE context modification request 1408 and a UE context modification response 1410 are communicated. The UE context modification response 1410 includes the survival time information, along with the UE context setup request 1412 from the basestation-CU to the target basestation-DU. A UE context setup response 1414 and a UE context modification request 1416 is made. RRC reconfiguration 1418 from the source basestation-DU to the UE includes the survival time information and is followed by a UE context modification response 1420. When the UE enters the survival time state after handover, the target basestation-DU obtains the survival time monitoring information by at least one of: 1) the survival time information is included in the UE CONTEXT SETUP REQUEST 1412 of the basestation-CU; 2) the survival time information is included in a message of the Random Access Procedure 1422, wherein the message includes message A in 2-step RACH (Random Access Channel) and message 3 in 4-step RACH; and/or the survival time information is included in the RRC Reconfiguration Compete 1424 of the UE, which is provided to the basestation-CU 1426. In one embodiment, the basestation-CU obtained the survival time information by UE CONTEXT MODIFICATION RESPONSE, and the UE obtained the survival time information by RRC Reconfiguration.

In DAPS handover, since there is no interruption in packet transmission, it may only be necessary to consider the example that the previous packet is in the source basestation and the next packet is in the target basestation. Because the handover process of DAPS may be the same as the traditional handover process, the transmission method of survival time monitoring information in the traditional handover may also be applicable to the handover process of DAPS.

FIG. 15 shows an example of Ethernet header compression ("EHC") parameters communicated between basestation centralized units ("CU"). In the case of multiple centralized unit upper planes ("CU-UP") of a UE, the basestation may ensure that the total number of EHC contexts of the UE is less than or equal to the maximum number of EHC contexts supported by the UE (e.g. maxNumberEHC-Context). For centralized unit control plane ("CU-CP"), it knows the maximum number of EHC contexts supported by UE (e.g. maxNumberEHC-Context), and the maximum number of uplink EHC contexts supported on each data radio bearers ("DRB") (e.g. maxCID-EHC-UL), where one CU-CP corresponds to multiple CU-UPs. In order to avoid the total number of EHC contexts exceeding the maxNumberEHC-Context when a UE contains more than one CU-UP, the CU-CP may be enhanced in one of two processes. In the first process, the CU-CP notifies the CU-UP by including the maximum number of downlink EHC contexts (maxCID-EHC-DL) for a CU-UP in the EHC Parameters. This value is determined by CU-CP based on all maxCID-EHC-UL and maxNumberEHC-Context supported by DRB on UE. In a second process, the CU-CP notifies the CU-UP by including the maximum number of uplink and downlink EHC contexts for a CU-UP (maxCID-EHC) in the EHC parameters. This value may be determined by the CU-CP based on UE's maxNumberEHC-Context. In other words, the maxCID-EHC-DL (the maximum number of downlink EHC contexts) or maxCID-EHC (the maximum number of uplink and downlink EHC contexts) may be included in the EHC Parameters.

FIG. 16 shows communication between a basestation centralized unit ("CU") and a basestation distribution unit ("DU"). The basestation is divided between gNB-CU and gNB-DU. When the UE needs to perform Propagation Delay Compensation ("PDC"), the basestation-CU notifies the basestation-DU to send gNB Rx-Tx, which is basestation time difference information that is requested from the gNB-CU to gNB-DU. The request information includes at least one of the following: REFERENCE TIME INFORMATION REPORTING CONTROL, RESET, ERROR INDICATION, GNB-CU CONFIGURATION UPDATE, GNB-DU RESOURCE COORDINATION REQUEST, PAGING, SYSTEM INFORMATION DELIVERY COMMAND.

FIG. 17 shows communication between a basestation distribution unit ("DU") and the user equipment ("UE") for sending the time different information. As shown in FIG. 17, the triggering conditions for sending gNB Rx-Tx time difference information in the basestation-DU to the UE are sent by the basestation-DU actively or based on the basestation-CU request shown in FIG. 16. In this example, the gNB Rx-Tx time difference is transmitted through a predefined MAC CE, and the Logical Channel ID ("LCD") reserved value in the Downlink Shared Channel ("DL-SCH") indicates the predefined MAC CE format. For example, the MAC CE format of the gNB Rx-Tx time difference in a basic time unit for NR ("Tc") is shown in FIGS. 18-19. $T_c=1/(\Delta f_{max} \cdot N_f)$ where $\Delta f_{max}=480 \cdot 10^3$ Hz and $N_f=4096$.

FIG. 18 shows an example MAC CE format. The MAC CE format includes 21 bits (which is used to represent gNB Rx-Tx time difference) and 3 bits (which is used to indicate reserved bit).

FIG. 19 shows another example MAC CE format. The MAC CE format includes 21 bits (which is used to represent gNB Rx-Tx time difference) and 3 bits (which is used to represent the k value in reporting resolution). The reporting resolution is defined as Tc*2k where k is selected by gNB from the set {0, 1, 2, 3, 4, 5}.

The system and process described above may be encoded in a signal bearing medium, a computer readable medium such as a memory, programmed within a device such as one or more integrated circuits, one or more processors or processed by a controller or a computer. That data may be analyzed in a computer system and used to generate a spectrum. If the methods are performed by software, the software may reside in a memory resident to or interfaced to a storage device, synchronizer, a communication interface, or non-volatile or volatile memory in communication with a transmitter. A circuit or electronic device designed to send data to another location. The memory may include an ordered listing of executable instructions for implementing logical functions. A logical function or any system element described may be implemented through optic circuitry, digital circuitry, through source code, through analog circuitry, through an analog source such as an analog electrical, audio, or video signal or a combination. The software may be embodied in any computer-readable or signal-bearing medium, for use by, or in connection with an instruction executable system, apparatus, or device. Such a system may include a computer-based system, a processor-containing system, or another system that may selectively fetch instructions from an instruction executable system, apparatus, or device that may also execute instructions.

A "computer-readable medium," "machine readable medium," "propagated-signal" medium, and/or "signal-bearing medium" may comprise any device that includes stores, communicates, propagates, or transports software for use by or in connection with an instruction executable system, apparatus, or device. The machine-readable medium may selectively be, but not limited to, an electronic, magnetic, optical, electromagnetic, infrared, or semiconductor system, apparatus, device, or propagation medium. A non-exhaustive list of examples of a machine-readable medium would include: an electrical connection "electronic" having one or more wires, a portable magnetic or optical disk, a volatile memory such as a Random Access Memory "RAM", a Read-Only Memory "ROM", an Erasable Programmable Read-Only Memory (EPROM or Flash memory), or an optical fiber. A machine-readable medium may also include a tangible medium upon which software is printed, as the software may be electronically stored as an image or in another format (e.g., through an optical scan), then compiled, and/or interpreted or otherwise processed. The processed medium may then be stored in a computer and/or machine memory.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The phrase "coupled with" is defined to mean directly connected to or indirectly connected through one or more intermediate components. Such intermediate components may include both hardware and software based components. Variations in the arrangement and type of the components may be made without departing from the spirit or scope of the claims as set forth herein. Additional, different or fewer components may be provided.

The above disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description. While various embodiments of the invention have been described, it will be apparent to those of ordinary skill in the art that many more embodiments and implementations are possible within the scope of the invention. Accordingly, the invention is not to be restricted except in light of the attached claims and their equivalents.

The invention claimed is:

1. A method for wireless communication, performed by a wireless communication system comprising a base station, the method comprising:

transmitting, from a Centralized Unit Control Plane (CU-CP) of the base station to a CU User Plane (CU-UP) among a plurality of CU-UPs of the base station, an Ethernet Header Compression (EHC) parameter indicating a maximum number of downlink (DL) EHC contexts supported by a wireless device with respect to the CU-UP, wherein:

the wireless device is configured to communicate with the plurality of CU-UPs;

the CU-CP corresponds to the plurality of CU-UPs, and is aware of a maximum number of EHC contexts supported by the wireless device and a maximum number of uplink EHC contexts supported by each data radio bearers (DRB) on the wireless device; and the maximum number of downlink EHC contexts supported by the wireless device with respect to each of the plurality of CU-UPs is determined by the CU-CP based on all the maximum number of uplink EHC contexts supported on each DRB and the maximum number of EHC contexts supported by the wireless device.

2. The method of claim 1, wherein a maximum number of EHC contexts supported by the wireless device is a sum of the maximum number of downlink (DL) EHC contexts supported by the wireless device and a maximum number of uplink (UL) EHC contexts supported by the wireless device.

3. The method of claim 1, further comprising:

transmitting, from the CU to a Distributed Unit (DU) of the base station, a request message requesting a base station Receive-Transmit (Rx-Tx) time difference information.

4. The method of claim 3, wherein the base station Rx-Tx time difference information is used by the wireless device to perform Propagation Delay Compensation (PDC).

5. The method of claim 3, wherein the request message comprises at least one of:

a reference time information reporting control message;

a reset message;

an error indication message;

a gNB-CU configuration update message;

a gNB-DU resource coordination request message;

a paging message; or a system information delivery command.

6. The method of claim 3, further comprising:

receiving, by the CU from the DU, a response to the request message, the response comprising the base station Rx-Tx time difference information.

7. The method of claim 3, further comprising:

receiving, by the wireless device, a message including configured packet data convergence protocol (PDCP) duplication function and configured grant (CG) type information; and activating, by the wireless device, a duplication function based on a retransmission scheduling information.

8. The method of claim 7, wherein the activating is performed independently by the wireless device during an uplink transmission, and the message is received by the wireless device from the base station.

9. The method of claim 8, further comprising:

receiving, by the wireless device, an activation message to activate the CG, wherein the activation message comprises a predefined Downlink Communication Information (DCI) including an indication to activate the CG.

10. The method of claim 9, wherein the configured CG type information comprises a CG type which does not require activation or a CG type which requires activation by the predefined DCI.

11. The method of claim 8, wherein the PDCP duplication function further comprises configuration for multiple radio link control (RLC) entities, and the RLC entities are configured for the wireless device for the activating.

12. The method of claim 7, wherein the message comprises a radio resource control (RRC) message, which includes at least one of RRCReestablishment, RRCReconfiguration, RRCResume, RRCReject, or RRCSetup.

13. The method of claim 1, further comprising:

receiving, by the wireless device from the base station after a retransmission of a first packet that was subject to a transmission failure, a first status indication information; and performing, after receiving the first status indication information, a status handover.

14. The method of claim 13, wherein the first status indication information indicates whether the first packet retransmission was successful, and comprises at least one of an acknowledgment of a successful retransmission of the first packet, a keep survival time state indication when retransmission is unsuccessful, an exit survival time state indication when the retransmission is successful, or a non-acknowledgment for the retransmission.

15. The method of claim 13, further comprising:

transmitting, by the wireless device to the base station, a second packet transmission when the first status indication information indicates the retransmission is not received; and receiving, by the wireless device from the base station when the second packet is received, a second status indication information for the second packet on any branch.

16. The method of claim 15, wherein the second status indication information indicates whether the second packet transmission was successful, and the information comprises a predefined DCI or MAC Control Element when the retransmission is unsuccessful.

17. A wireless communication system comprising:

a base station;

one or more processors;

one or more storage devices storing instructions that, when executed by the one or more processors, cause the wireless communication system to perform operations comprising:

transmitting, from a Centralized Unit Control Plane (CU-CP) of the base station to a CU User Plane (CU-UP) among a plurality of CU-UPs of the base station, an Ethernet Header Compression (EHC) parameter indicating a maximum number of downlink (DL) EHC contexts supported by a wireless device with respect to the CU-UP, wherein:

the wireless device is configured to communicate with the plurality of CU-UPS;

the CU-CP corresponds to the plurality of CU-UPs, and is aware of a maximum number of EHC contexts supported by the wireless device and a maximum number of uplink EHC contexts supported by each data radio bearers (DRB) on the wireless device; and the maximum number of downlink EHC contexts supported by the wireless device with respect to each of the plurality of CU-UPs is determined by the CU-CP based on all the maximum number of uplink EHC contexts supported on each DRB and the maximum number of EHC contexts supported by the wireless device.

18. The wireless communication system of claim 17, wherein a maximum number of EHC contexts supported by the wireless device is a sum of the maximum number of downlink (DL) EHC contexts supported by the wireless device and a maximum number of uplink (UL) EHC contexts supported by the wireless device.

19. The wireless communication system of claim 17, wherein the operations further comprise:

transmitting, from the CU to a Distributed Unit (DU) of the base station, a request message requesting a base station Receive-Transmit (Rx-Tx) time difference information.

20. The wireless communication system of claim 19, wherein the base station Rx-Tx time difference information is used by the wireless device to perform Propagation Delay Compensation (PDC).

* * * * *